United States Patent [19]
Conner

[11] 3,737,273
[45] June 5, 1973

[54] NECK FORMING PLUG WITH EMBEDDED DIAMOND PARTICLES

[75] Inventor: Robert J. Conner, Bartlesville, Okla.

[73] Assignee: Phillips Petroleum Company, Bartlesville, Okla.

[22] Filed: Jan. 7, 1971

[21] Appl. No.: 104,562

[52] U.S. Cl..................................425/326, 425/392
[51] Int. Cl. ............................................B29d 23/03
[58] Field of Search...................308/DIG. 8; 72/358, 72/357, 42; 264/338, 94, 98; 18/5 BA, 5 BM, 5 BE, 5 TM, 5 TE; 425/326, 387, 392, 393

[56] References Cited

UNITED STATES PATENTS

| | | | |
|---|---|---|---|
| 3,360,826 | 1/1968 | Lorang | 18/19 TE |
| 3,550,200 | 12/1970 | Gilbert | 18/5 BM |
| 2,330,837 | 10/1943 | Mullen | 264/338 X |
| 2,890,483 | 6/1959 | Soubier | 18/5 BE UX |
| 3,127,636 | 4/1964 | Heider | 264/98 |
| 3,311,950 | 4/1967 | Strauss | 18/5 BA |
| 3,466,707 | 9/1969 | Click et al. | 18/19 TE |
| 3,507,005 | 4/1970 | Wiley et al. | 264/94 X |

FOREIGN PATENTS OR APPLICATIONS

| 13,458 | 12/1905 | Great Britain | 308/DIG. 8 |
|---|---|---|---|

Primary Examiner—J. Spencer Overholser
Assistant Examiner—Michael O. Sutton
Attorney—Young and Quigg

[57] ABSTRACT

In the forming of a hollow object from a temperature conditioned thermoplastic parison, the parison is clamped at one end by a neck forming means, and a plug with diamond particles embedded in the surface thereof is inserted into this end of the parison to force the thermoplastic to conform to the shape of the neck forming means.

8 Claims, 4 Drawing Figures

PATENTED JUN 5 1973  3,737,273

INVENTOR.
R. J. CONNER
BY
Young + Swigg
ATTORNEYS

NECK FORMING PLUG WITH EMBEDDED DIAMOND PARTICLES

BACKGROUND OF THE INVENTION

This invention relates to a neck forming plug for a thermoplastic blow molding device.

While patents in the blow molding art go back over 100 years, it has only been in the last dozen years or so that this technique has achieved significant success. Very recently techniques have been developed for forming biaxially oriented hollow articles utilizing a technique wherein a parison is fabricated at orientation temperature. Such techniques are disclosed in Wiley, U.S. Pat. No. 3,288,317, and Turner et al. U.S. Pat. No. 3,390,426, the disclosures of which are hereby incorporated by reference. The techniques disclosed in said Wiley and Turner et al. patents make possible the production of articles having very desirable properties, which properties cannot be obtained in conventional processes. However, by virtue of the fact that the parison is at orientation temperature during the fabrication process, many manipulative operations which are easily carried out on a thoroughly molten parison present special problems utilizing this technique.

One particularly difficult problem is getting a good finish on the neck and/or thread area. A tapered plug can be inserted into the interior of the parison to force it out into conformity with thread-forming jaws. However, because the parison is at orientation temperature which is well below the point at which it is molten, a substantial amount of force is required to accomplish this. It has been found that with plugs of metal, such as steel, the parison may be pushed out of the molding jaws, rather than being expanded into conformity with the thread-forming zone. Various plastic materials such as nylon which are known to have a low coefficient of friction tend to develop a build-up of deposits which causes ticking. This problem can be partially overcome utilizing a plug made of polytetrafluoroethylene but polytetrafluoroethylene is not sufficiently hard, thus it tends to wear out in a short time.

SUMMARY OF THE INVENTION

It is an object of this invention to provide an improved process and apparatus for forming biaxially oriented hollow articles; and it is a further object of this invention to provide bottles and the like having the advantage of high strength imparted by orientation without sacrifice in the quality of the detail in the neck and/or thread area.

In accordance with this invention one end of a thermoplastic parison at orientation temperature is expanded out into conformity with a neck forming zone by means of the insertion of a plug having diamond particles embedded in the surface thereof.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 1:
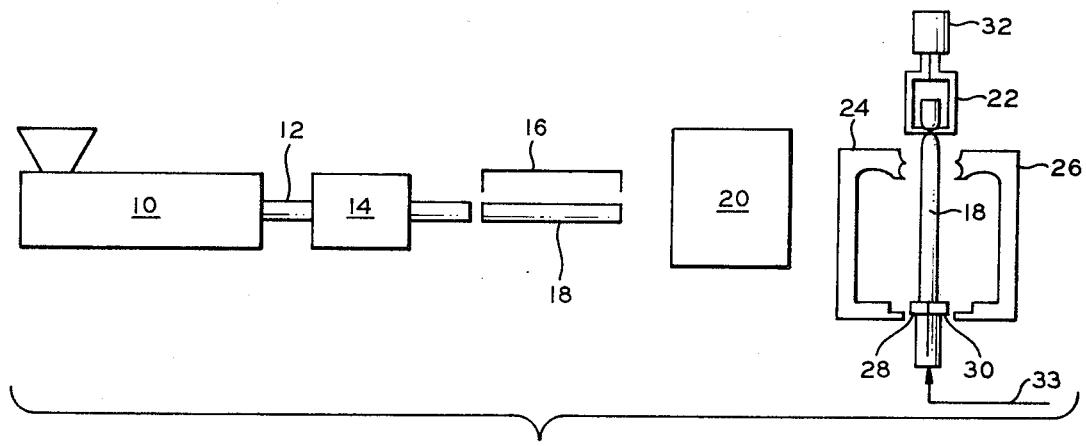
FIG. 1 is a schematic representation of a molding apparatus adapted to utilize the instant invention.

The thread forming plug of the instant invention is of particular utility in the forming of oriented blow molded articles. Exemplary of the type of thermoplastics which can be formed at orientation temperature utilizing this plug are crystalline materials such as polymers of at least one mono-1-olefin having two to eight carbon atoms per molecule preferably polymers and copolymers of ethylene, propylene, and butene, more preferably polypropylene, and amorphous polymers such as poly(vinyl chloride), various styrene-butadiene containing copolymers, and the like.

These polymers are formed into parison preforms and cooled to a temperature below the freezing point. The preforms are then heated to orientation temperature, which for the crystalline materials is generally about 1–50, preferably 10°–30°F, below their crystalline melting point, and for the amorphous materials is generally 40–200, preferably 100°–175°, below the homogeneous melt point. At this temperature they are stretched longitudinally to impart longitudinal orientation and caused to expand and form to the shape of a mold by the application of differential fluid pressure thus imparting circumferential orientation to give a biaxially oriented product.

The plug must be made of a hard material preferably a material having a Brinnell hardness of at least 40. Exemplary materials are metals such as brass, stainless steel, Stellite (an alloy comprising 40–80 percent cobalt, 20–35 percent chromium, and 0.75–2.5% carbon) and the like.

The presence of the diamond particles can lower the static coefficient of friction as measured against a similar material, to less than half that of the base material. Thus, the advantage of lower coefficient of friction is obtained with an increase in the hardness of the plug instead of the sacrifice in hardness required if a lower coefficient of friction is obtained by means of a polytetrafluoroethylene coating, for instance.

The diamond particles can have a grit size of 150–2,000, preferably 300–1,800, that is the particles will pass through a screen having 150–2,000, preferably 300–1,800 meshes (Tyler series) per lineal inch.

The diamond particles can be embedded in the substrate by any manner conventional in the art. For instance, they can be forced into the surface utilizing a carbide roller on a lathe. In this way high pressure can be exerted to roll the diamond particles into the surface of the substrate. The diamond particles are also embedded into the roller and therefore a different roller must be used for each particle size of diamond. Generally, the diamond particles will be embedded in the substrate in an amount sufficient to give at least 50, preferably 75–97 percent, of the surface covered by diamond particles. The resulting plug having embedded diamond particles may thereafter be polished to give a smooth surface. Generally, the surface will have a finish of about 1–125, preferably 3–10 microinches root mean square (rms). It is further preferred that the plug have generally annular serrations around the portion of the plug forming the inner neck finish. Preferably, the serrations will have a depth of 1–4, preferably 1–2 mils.

Referring now to the drawings, particularly FIG. 1, there is shown an extrusion means 10 for forming a tubular extrudate 12. The tubular extrudate passes through vacuum cooling in sizing chamber 14 and thence to cutter 16 where it is severed into individual parison preforms 18. Parison preforms 18 pass through air oven 20 where they are heated to orientation temperature. Thereafter they are transported by gripper means 22 into position between mold halves 24 and 26 and placed within thread forming jaws 28 and 30. Cylinder 32 provides means for effecting relative axial movement between gripping jaws 28 and 30 and gripping means 22 so as to stretch said parison 18 longitudinally. Line 33 serves as a means to introduce fluid pressure to expand said parison. In this view, the operation is shown forming a bottle in an upside down position although the bottle can also be formed with the thread area at the top as shown in FIG. 3.

Figure 2:
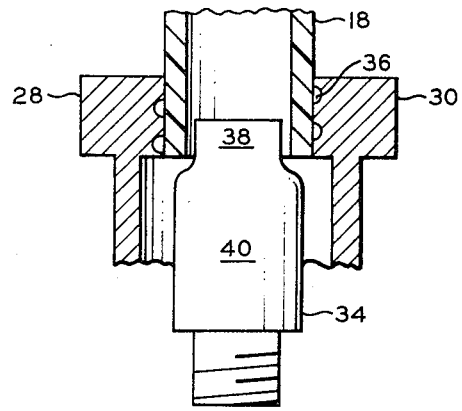
FIG. 2 is a side elevation partially in section of the jaw means of FIG. 1 enlarged to show the relationship of the plug.

FIG. 2 is a greatly enlarged view of the thread forming jaws 28 and 30 shown partially in section so as to reveal the neck forming plug 34. In operation plug 34 is moved axially into the parison as shown by the arrow either before, during, or after the stretching operation to cause said parison to expand out into conformity with the neck contour such as threads 36. Plug 34 has an initial small cylindrical section 38 and a larger cylindrical section 40 connected thereto by means of a tapered shoulder. At least the portion of large cylindrical section 40 which comes in sliding contact with the parison has embedded therein diamond particles as described hereinabove. Generally all of the shoulder area also will have diamond particles embedded therein.

Figure 3:
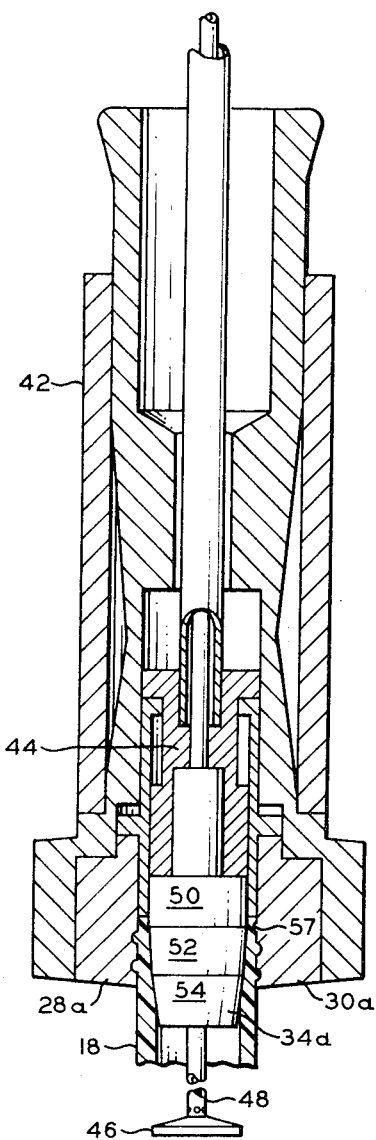
FIG. 3 is a sectional view of jaw and plug assembly in accordance with an alternative embodiment of the invention.

FIG. 3 is a view, partially in section, of an alternative embodiment of the thread forming jaws and plug of the instant invention. In this embodiment thread forming jaws are disposed at the top so as to blow the bottle with the threads at the top as opposed to upside down. In operation parison 18 is placed between jaw members 28a and 30a and the jaws pivot to grasp the parison as a result of cam tube 42 being moved downward. Thereafter plug 34a is forced downward into parison 18 by means of the downward movement of member 44 which is connected to plug 34a. Pressure can be exerted against the closed off bottom of the parison by means of stomper foot 46 carried by rod 48. Plug 34a has a cylindrical section 50, a first frusto conical section 52 with a taper such that the surface of said first frusto conical section makes a first angle with a line extending from the surface of said cylindrical section from 0.5° to 5°, a second frusto conical section 54 with a taper such that the surface of said second frusto conical makes an angle with a line extending from said surface of said cylindrical section of from 6°–20°, the small base of said first frusto conical section being coextensive with the large base of said second frusto conical section. The surface of frusto conical section 52 and preferably all of the surfaces of plug 34a which come in contact with parison 18 have diamond particles embedded therein as is described hereinabove.

Figure 4:
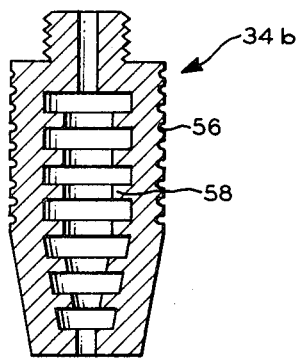
FIG. 4 is a sectional view of a plug in accordance with another alternative embodiment of the invention.

FIG. 4 describes another alternative embodiment wherein plug 34b has annular serrations 56. This allows forming of a smooth polished surface, for instance, its in the preferred embodiments having a finish of 3–10 microinches rms and yet prevents sticking which can result due to large surface area contact. Also, the plug 34b has cooling fins 58 so that air can be introduced therethrough and serve to cool the plug. Plug 34 can also have generally annular serrations superimposed over the 1–125, preferably 3–10, microinch rms surface finish. As in the other embodiments, diamond particles are embedded in plug 34b in the polymer contacting surfaces.

The gripping jaws may also contain an annular ridge as shown by reference character 57 in FIG. 3 to further aid in holding the parison within the jaws on insertion of the plug.

Many conventional parts such as temperature controllers, frame elements, and the like have been ommitted from the drawings for the sake of simplicity but their inclusion is understood by those skilled in the art and is within the scope of the invention.

EXAMPLE

A brass plug having the general configuration of that shown in FIG. 2 was impregnated with 1,200 grit diamond particles by means of a carbide roller. The plug was installed in an apparatus similar to that shown in FIGS. 1 and 2. Propylene homopolymer having a density of 0.905 (ASTM D 1505–63T), a melt index of 2 (ASTM D 1238–62T, condition L), and a crystalline melting point of about 340°F was extruded into tubing having an outside diameter of about 0.85-inch and a wall thickness of about 0.15-inch. This tubing was cooled to room temperature cut into about 5-inch blanks and reheated to about 320°F. It was then grasped at a lower end thereof by gripping means such as shown in the drawing and the other end thereof by thread forming jaws such as those shown in the drawings. It was then stretched to about 200 percent of its original length and the plug having diamond particles embedded therein as described hereinabove was moved axially into the open of the parison to expand same out into conformity with the thread forming means of the jaws. Thereafter, internal fluid pressure was introduced into the parison to expand same out into conformity with the mold walls to produce a bottle having excellent tolerance in the thread area.

While this invention has been described in detail for the purpose of illustration, it is not to be construed as limited thereby but is intended to cover all changes and modifications within the spirit and scope thereof.

I claim:

1. Blow molding apparatus comprising in combination:
    means for forming the neck portion of a finished article comprising jaw means and a plug;
    said jaw means being adapted to grasp an open end of a thermoplastic tubular parison;
    said plug being coaxially disposed relative to said jaw means, and being made of a material having a Brinell hardness of at least 40 having embedded on a surface thereof diamond particles having a grit size within the range of 150–2000; and means for moving said plug axially relative to said jaw means.

2. Apparatus according to claim 1 wherein said plug has a first cylindrical section adapted to enter said parison, and a second cylindrical section adjacent to said first section having a larger diameter, said first and second sections being connected by a gradually sloping shoulder section.

3. Apparatus according to claim 2 wherein said second section has a surface finish within the range of 1–125 microinches rms, over which is superimposed generally annular serrations.

4. Apparatus according to claim 3 wherein said finish is within the range of 3 to 10 microinches rms.

5. Apparatus according to claim 3 wherein the portions of said plug having diamond particles embedded therein have at least 50 percent of the surfaces thereof covered by said diamond particles.

6. Apparatus according to claim 3 wherein static coefficient friction of said plug as measured against a similar material is less than half the coefficient friction of the base material.

7. Apparatus according to claim 1 wherein said material having a hardness of greater than 40 is selected from the group consisting of brass, stainless steel, and a cobalt-chromium-carbon alloy.

8. Apparatus according to claim 1 comprising in addition:

means to extrude a continuous length of tubing;
means to cool said tubing;
means to cut said tubing into said tubular parisons;
means to reheat said tubular parisons;
means to stretch said tubular parisons longitudinally;
mold means;
and means to introduce fluid pressure into said parison so as to expand same into conformity with said mold means.

* * * * *